(12) United States Patent
Guler et al.

(10) Patent No.: US 11,131,595 B2
(45) Date of Patent: Sep. 28, 2021

(54) PRESSURE SENSING DEVICE AND METHOD FOR USING THE SAME

(71) Applicant: UNITED TECHNOLOGIES CORPORATION, Farmington, CT (US)

(72) Inventors: Urcan Guler, Avon, CT (US); Kenji Homma, Glastonbury, CT (US); Xuemei Wang, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/522,917

(22) Filed: Jul. 26, 2019

(65) Prior Publication Data

US 2021/0025775 A1 Jan. 28, 2021

(51) Int. Cl.
*G01L 11/02* (2006.01)
*G01L 1/24* (2006.01)

(52) U.S. Cl.
CPC ............... *G01L 11/02* (2013.01); *G01L 1/24* (2013.01)

(58) Field of Classification Search
CPC ...................................... G01L 11/02
USPC ....................................... 356/300
See application file for complete search history.

(56) References Cited

U.S. PATENT DOCUMENTS

| 4,859,060 | A | * | 8/1989 | Katagiri | ................. G01D 5/266 356/454 |
| 4,933,545 | A | * | 6/1990 | Saaski | ................... G01L 9/0079 250/227.14 |
| 5,889,590 | A | * | 3/1999 | Duggal | .................... G01B 9/08 356/519 |
| 8,695,430 | B1 | * | 4/2014 | Eldridge | ................ G01K 11/20 73/705 |
| 8,710,611 | B2 | | 4/2014 | Cao | |
| 2003/0137672 | A1 | * | 7/2003 | Moriya | ................. G01J 9/0246 356/519 |
| 2005/0226281 | A1 | * | 10/2005 | Faraone | ............... G02B 26/001 372/20 |
| 2007/0042524 | A1 | * | 2/2007 | Kogut | ................. B81C 1/00666 438/52 |
| 2011/0015354 | A1 | * | 1/2011 | Marchand | ............. C08F 297/08 526/65 |
| 2011/0280279 | A1 | * | 11/2011 | Gregory | ................. G01K 7/343 374/152 |

(Continued)

OTHER PUBLICATIONS

Eldering et al. "Characterization of modulated spin-coated and Langmuir-Blodgett thin film etalons". Thin Solid Fims, vol. 179, No. 1-2. Nov. 11, 1989. pp. 535-542.

(Continued)

*Primary Examiner* — Tarifur R Chowdhury
*Assistant Examiner* — Omar H Nixon
(74) *Attorney, Agent, or Firm* — Carlson, Gaskey & Olds, P.C.

(57) ABSTRACT

A pressure sensing film includes first and second films. The first and second films are configured to form an optical cavity therebetween. A flexible transparent film is arranged in the optical cavity. The flexible transparent film is compressible in response to a pressure change in air adjacent the pressure sensing film. A pressure sensing device and a method of sensing pressure adjacent a surface are also disclosed.

20 Claims, 5 Drawing Sheets

(56) References Cited

U.S. PATENT DOCUMENTS

| | | | |
|---|---|---|---|
| 2012/0295364 A1* | 11/2012 | Papkovsky | G01L 1/24 |
| | | | 436/136 |
| 2013/0127879 A1 | 5/2013 | Burns et al. | |
| 2014/0000377 A1* | 1/2014 | Lin | B81B 7/0077 |
| | | | 73/754 |
| 2016/0123829 A1* | 5/2016 | Reck | G01L 9/0076 |
| | | | 73/705 |
| 2018/0088702 A1* | 3/2018 | Shutzberg | G06F 3/0418 |
| 2018/0348900 A1* | 12/2018 | Heinrich | G06F 3/041 |
| 2020/0131997 A1* | 4/2020 | Hanlon | F02C 7/057 |

OTHER PUBLICATIONS

Hohlfeld, et al. "Tunable thermo-optic filter for WDM applications". Proceedings of the IEEE 15th Annual International Conference on Micro Electro Mechanical Systems. Jan. 24, 2002. pp. 564-567.

The Partial European Search Report for European Patent Application No. 20187214.0, dated Dec. 22, 2020.

* cited by examiner

PRESSURE SENSING DEVICE AND METHOD FOR USING THE SAME

BACKGROUND

During the design and operation of gas turbine engines and other vehicles or machines, various elements experience various air pressures. For example, a gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

These components experience air pressures as the air travels through the engine.

SUMMARY

A pressure sensing film according to an exemplary embodiment of this disclosure, among other possible things includes first and second films. The first and second films are configured to form an optical cavity therebetween. A flexible transparent film is arranged in the optical cavity. The flexible transparent film is compressible in response to a pressure change in air adjacent the pressure sensing film.

In a further examples of the foregoing, at least one of the first and second films is metallic.

In a further examples of any of the foregoing, at least one of the first and second films are comprised of gold.

In a further examples of any of the foregoing, at least one of the first and second film are comprised of stacked dielectric layers.

In a further examples of any of the foregoing, the first film is reflective and the second film is semi-transparent.

In a further examples of any of the foregoing, the first and second films are semi-transparent.

In a further examples of any of the foregoing, the flexible transparent film is comprised of a polymeric material.

In a further examples of any of the foregoing, the flexible transparent film is comprised of luminescent particles.

In a further examples of any of the foregoing, the luminescent particles are thermographic phosphors.

In a further examples of any of the foregoing, the pressure sensing film is configured to sense a pressure adjacent a surface of a structure in a gas turbine engine.

A pressure sensing device according to an exemplary embodiment of this disclosure, among other possible things includes a pressure sensing film. The pressure sensing firm includes first and second films. The first and second films are configured to form an optical cavity therebetween. A flexible transparent film is arranged in the optical cavity. The flexible transparent film is compressible in response to a pressure change in air adjacent the pressure sensing film. A light source is configured to shine light onto the pressure sensing film. A spectrograph is configured to a photograph light from the pressure sensing film, and a computing device is configured to analyze information from the spectrograph to determine a pressure change in the air adjacent the pressure sensing film based on compression of the flexible transparent film.

In a further examples of the foregoing, at least one of the first and second films are metallic.

In a further examples of any of the foregoing, at least one of the first and second film are comprised of stacked dielectric layers.

In a further examples of any of the foregoing, the first film is reflective and the second film is semi-transparent.

In a further examples of any of the foregoing, the spectrograph is configured to capture a photograph of light reflected from the first film.

In a further examples of any of the foregoing, the first and second films are semi-transparent.

In a further examples of any of the foregoing, the spectrograph is configured to capture a photograph of light transmitted through from the first and second films.

A method of sensing pressure adjacent a surface according to an exemplary embodiment of this disclosure, among other possible things includes shining a light source on a pressure sensing film. The pressure sensing film includes first and second films. The first and second films are configured to form an optical cavity therebetween. A flexible transparent film is arranged in the optical cavity. The flexible transparent film is compressible in response to a pressure change in air adjacent the pressure sensing film, collecting information about light from the pressure sensing film and analyzing the information to determine a pressure change in the air adjacent the pressure sensing film based on compression of the flexible transparent film.

In a further examples of the foregoing, the information is filtered to reduce noise.

In a further examples of any of the foregoing, the collecting is accomplished at least in part by a spectrograph.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
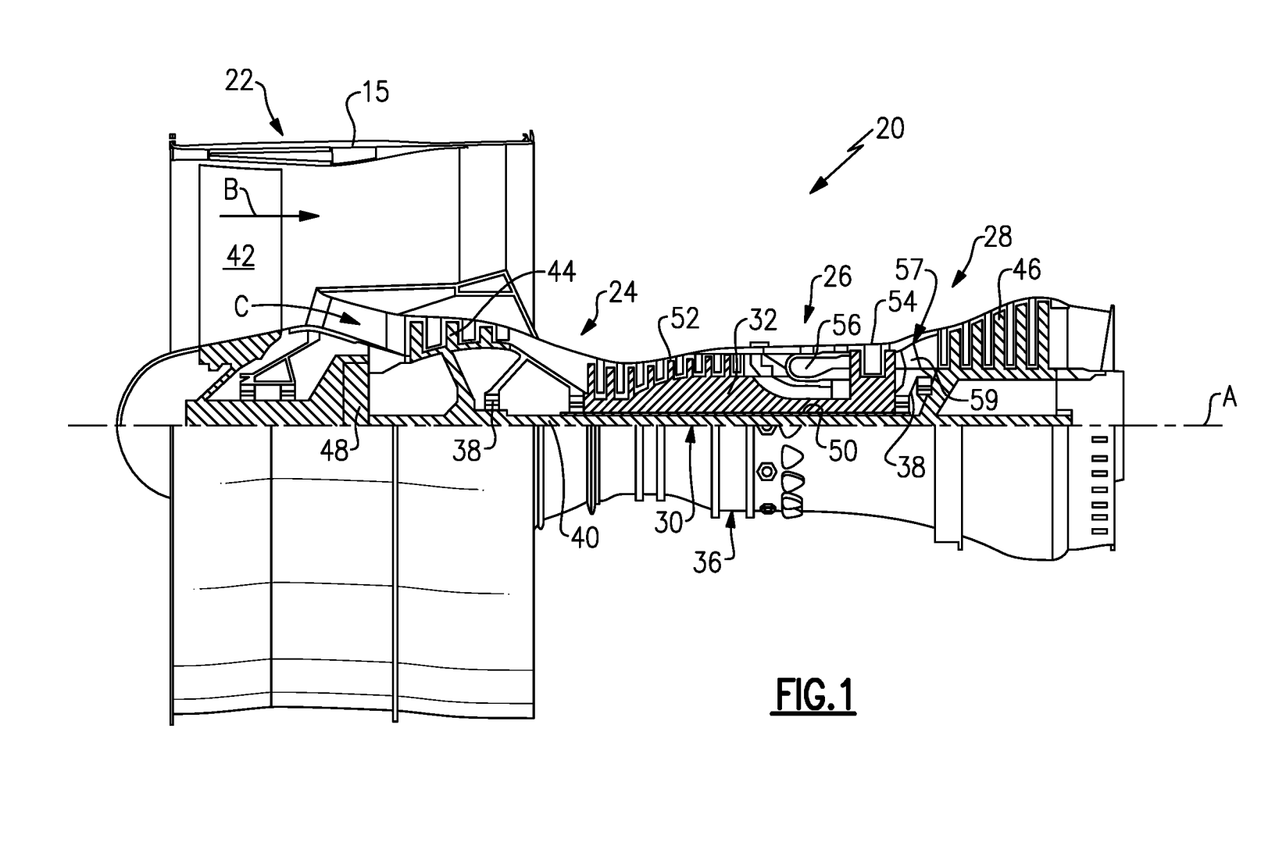
FIG. 1 is a schematic view of an example gas turbine engine.

The present application relates to a pressure-sensing device for sensing the pressure on a surface. The surface can be any surface. For instance, the concepts described herein can be applied to gas turbine engines, as shown in FIG. 1 and discussed below. However, it should be understood that the instant disclosure is not limited to gas turbine engines. The concepts described herein can also be applied to other types of vehicles, such as trains (e.g., maglev trains), automobiles, or other types of machinery or applications where pressure sensing is desired.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, as well as other types of vehicles and machinery.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Structures of the gas turbine engine 20 experience various air pressures during operation of the engine 20. For instance, the fan 42, compressors 44, 52, and turbines 46, 54 each include vanes and/or blades that experience varying air pressures. As another example, the housing 15 experiences varying air pressures. It should be understood that other structures within the engine 20, even those not specifically described above, would be known by one of ordinary skill in the art to experience various pressures and can incorporate the features described herein. In some cases, the air pressures experienced by the structures of the engine 20 are variable and depend on the operating conditions or mode of the engine 20.

Figure 2:
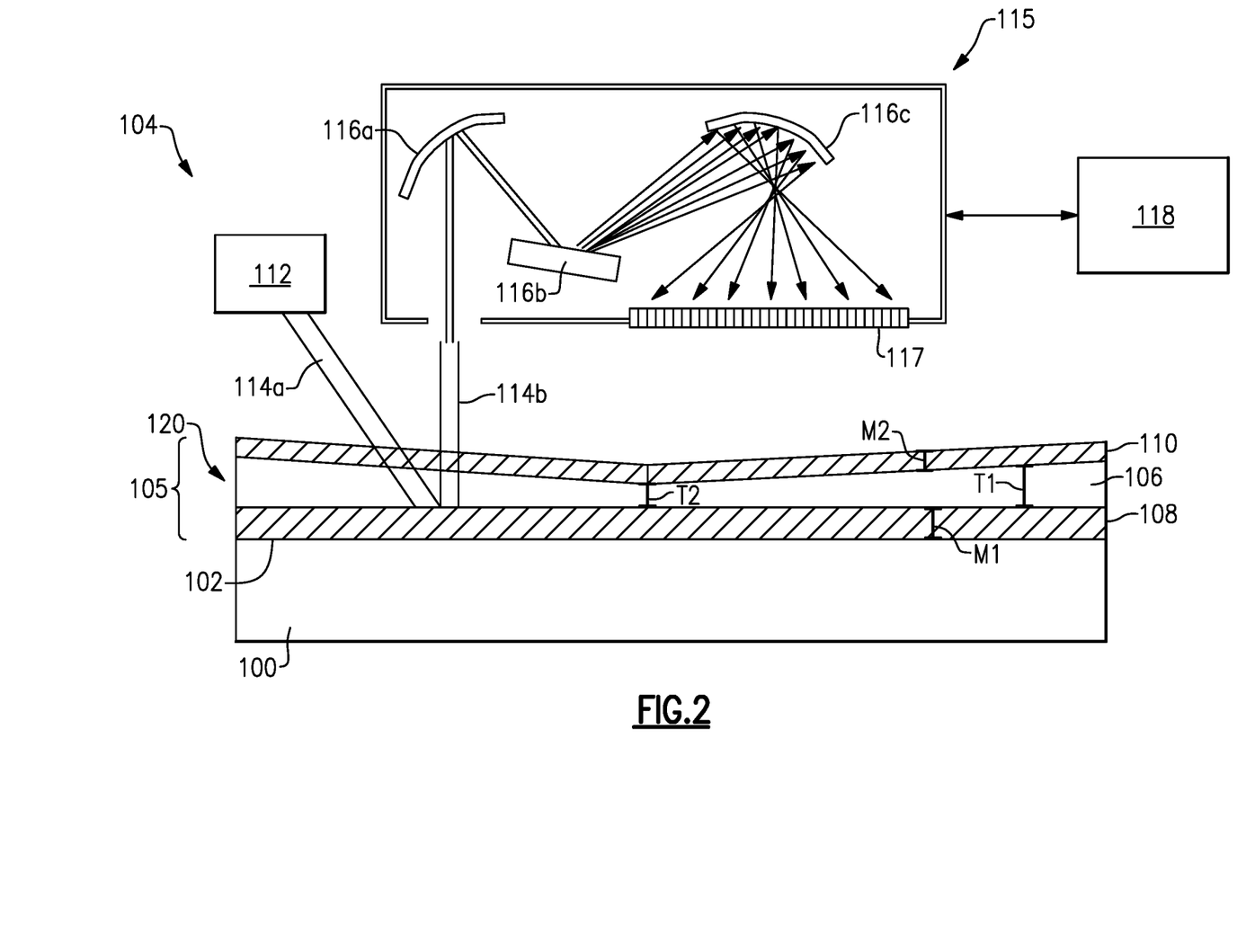
FIG. 2 schematically shows an example pressure sensing device.

Turning now to FIG. 2, FIG. 2 schematically shows an example structure 100 with a surface 102. As discussed above, the structure 100 can be any structure in the engine 20. The surface 102 can be a surface in a gas turbine engine 20 that is operational or a gas turbine engine 20 or section of a gas turbine engine 20 use for testing. In another example, the surface 20 can be a surface in another type of vehicle or machine, as discussed above.

A pressure sensing device 104 is arranged on the surface 102. The pressure sensing device 104 can cover parts of the surface 102 or the entire surface 102. The pressure sensing device 104 includes a pressure sensing film 105. The pressure sensing film 105 generally includes a flexible transparent film 106 sandwiched between two outer films 108, 110. The outer films 108, 110 generally serve to form an optical cavity 120 (discussed in more detail below) therebetween. For instance, the outer films 108, 110 may trap at least some light waves therebetween.

Figure 2B:
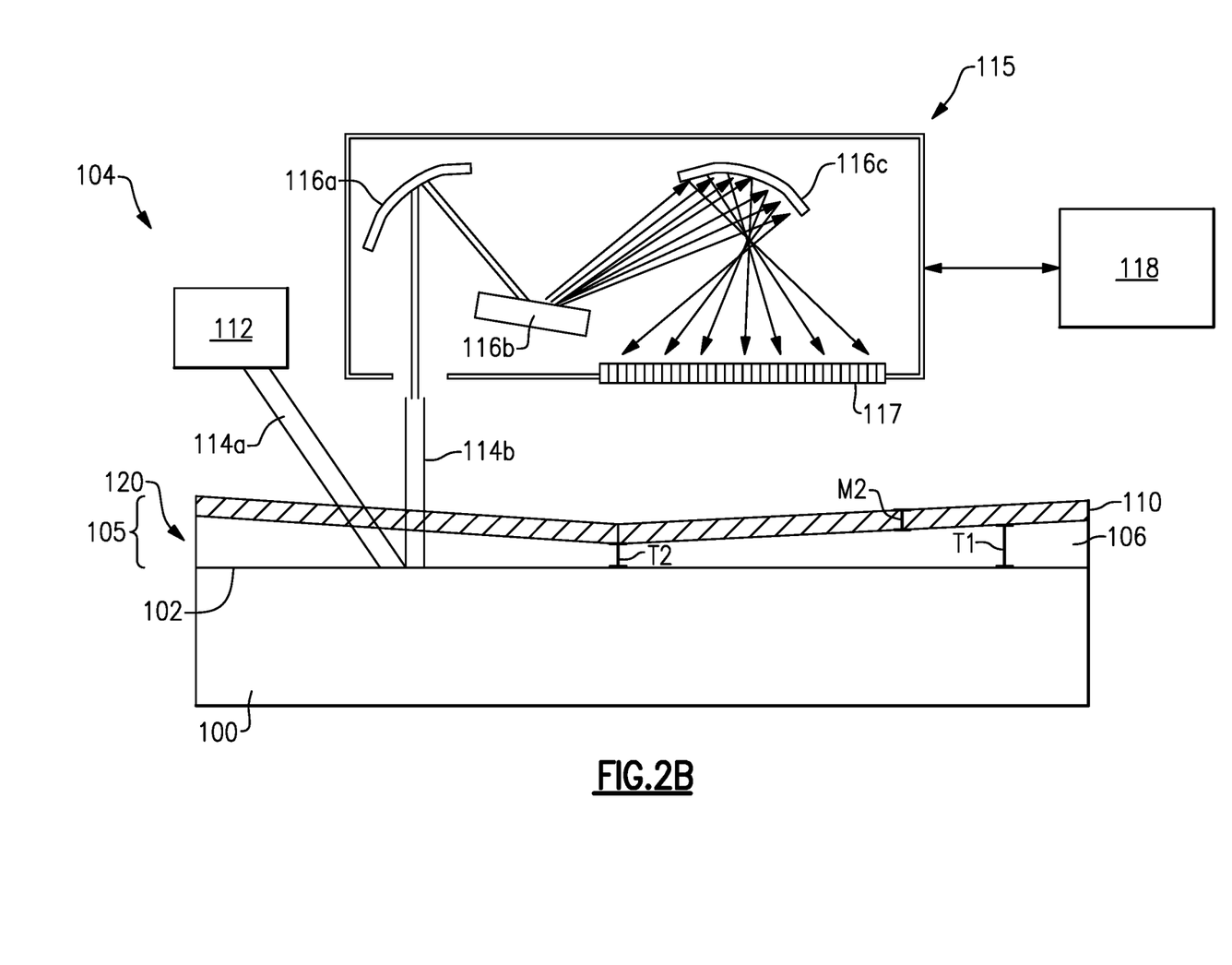
FIG. 2B schematically shows another example pressure sensing device.

In another example, show in FIG. 2B, the first film 108 is replaced by the surface 102. That is, the flexible transparent film 106 is arranged directly adjacent the surface 102. The surface 102 may be polished. In this example, the surface 102 acts like the first film 108 in any of the examples discussed below.

In the example of FIG. 2, a first film 108 is a metallic film and is reflective, meaning that the first metallic film 108 reflects substantially all of the light that encounters it. The first film 108 may be a thin film, e.g., have a thickness between about 1 nm and 5000 nm. In general, thin films are at least somewhat reflective. In another example, the first film 108 may be polished metal.

A second outer film 110 is arranged on an opposite side of the flexible transparent film 106 from the first metallic film 108. In one example, the second outer film 110 is a semi-transparent metallic film, meaning that it reflects only some of the light that encounters it, and remaining light passes through the second metallic film 110. The pressure sensing device 104 includes a light source 112 that is configured to shine light onto the pressure sensing film 105. A beam of light is schematically represented as 114a, though it should be understood the light from the light source 112 contains many such beams. The light source 112 can be any type of light source, such as a light source that provides a combination of light of different wavelengths ("white light"). In other examples, the light source 112 can provide a particular type of light, such as ultraviolet, visible, short-wave-infrared, mid-infrared, far-infrared, for instance. The light resonates within an optical cavity 120 in the pressure sensing film 105, discussed below, and is reflected out of the optical cavity by the first metallic film 108. A reflected light beam is schematically illustrated as 114b, though it should be understood the reflected light contains many such beams. The reflected light is indicative of the characteristics of the resonance of the light within the optical cavity.

A device capable of recording/analyzing light spectra, such as a spectrograph 115, is configured to capture "photographs" of the reflected light from the optical cavity 120. Accordingly, the information captured by the spectrograph 115 are indicative of the characteristics of the resonance of the light within the optical cavity. The reflected light can be captured from a point within the pressure sensing device 104 or across an area of the pressure sensing device 104, or both. For the latter, local pressures at individual points can also captured, so that a pressure "map" of pressures experienced by the component 102 is created. The spectrograph 115 is operable to send information about the reflected light to a computing device 118 that includes processors or other hardware programmed to analyze the information. The computing device 118 can be local to or remote from the spectrograph 115. The computing device 118 is operable to analyze the information from the spectrograph 115 in order to determine pressure experienced by the pressure sensing film 105, as will be discussed in more detail below. In some examples, the computing device 118 is also programmed to filter the information from the spectrograph 116 to reduce noise in the signals from the spectrograph 116 according to any known filtering techniques.

The spectrograph 115 can be any known type of spectrograph. In one example, the spectrograph 115 includes a focusing mirror 116a to focus the light beam 114b and a flat mirror 116b to direct the light beam 114b towards a diffraction grating 116c. The diffraction grating 116c disperses the light beam 114b into a frequency spectrum which is captured by a detector 117.

The outer films 108, 110 have thicknesses M1 and M2, respectively. For metallic films, the transparency of the first and second metallic films 108, 110 is related to the thickness and the composition of the first and second metallic films 108, 110. The thickness M1 of the first metallic film 108 is selected based on the composition of the first metallic film 108 so that substantially of the light beam 114a is reflected by the first metallic film 108. The thickness M2 of the second metallic film 110 is selected based on the composition of the second metallic film 110 so that at least some of the light beams 114a, 114b travel through the second metallic film 110. In a particular example, the metallic films 108, 110 comprise gold. In a more particular example, a first gold metallic film 108 is between about 50 and 250 nanometers thick and a second gold metallic film 110 is between about 10 and 50 nanometers thick. The metallic films 108, 110 can be deposited according to any know method, such as sputter coating or atomic layer deposition. Other example metallic films comprise nickel, titanium, aluminum, platinum, gold, other metals, or combinations thereof. Furthermore, in another example, the "metallic films" comprise other types of materials that have metal-like properties, such as titanium nitride and zirconium nitride or other transition metal nitrides. An optical cavity 120 is thus formed in the flexible transparent film 106 between the two metallic films 108, 110. The optical cavity 120 traps light in between the outer films 108, 110 so that the light resonates in the optical cavity 120. The optical cavity 120 has multiple resonance bands over a broad electromagnetic spectrum from ultraviolet to microwave. Resonance within the optical cavity 120 is related to an optical path length within the optical cavity 120, e.g., the geometry of the pathway of light beams 114a, 114b through the optical cavity 120. Accordingly, the thickness of the flexible transparent film 106 and thus the thickness of the optical cavity 120 is related to the resonance within the optical cavity 120.

In another example, at least one of the outer films 108, 110 comprise stacked dielectric layers ("dielectric mirrors"), which are operable to reflect some wavelengths of light. Other reflective or semi-transparent materials are also contemplated. In yet another example, the stacked layers can comprise alternating layers of dielectric and metallic materials forming a composite layer capable of selectively reflecting and transmitting light.

In yet another example, both the first and second outer films 108, 110 are semi-transparent. In this example, the pressure sensing device 104 is symmetrical, and the spectrograph 115 measures light transmitted through the optical cavity 120. Accordingly, the spectrograph 115 and light source 112 can be arranged on opposite sides of the pressure sensing device 105, in this example.

In one example, the flexible transparent film 106 is a polymeric material. In a more particular example, the flexible transparent film 106 is a polymeric material with a Young's modulus (which is related to stiffness of the transparent film 106) that is related to a degree of cross-linking within the polymeric material. That is, the Young's modulus, and thus the stiffness, of the polymeric material can be controlled by controlling the degree of cross-linking in the polymeric material by any known chemistry. One example such polymeric material is PDMS (polydimethylsiloxane). For PDMS, the degree of cross-linking is related to the ratio of PDMS base material to curing agent during the PDMS synthesizing process and its Young' modulus can vary between about 3 kPa (low cross-linking) to about 3000 kPa (high cross-linking). Another example polymeric material is a high temperature polyamide. The flexible transparent film 106 can be deposited onto the reflective metallic film 108 by any known method, such as spin coating or dip coating.

In one example, the flexible transparent film 106 can include luminescent particles, such as nanocrystals or dyes, which produce an optical signal that can be read by the spectrograph 115. The particles can be added to the polymer pre-cursor for the flexible transparent film 106 before cross-linking the precursor to form the flexible transparent form 106, in one example. The particles can provide additional functionality to the flexible transparent film 106. For instance, particles that are thermographic phosphors can allow for temperature sensing in the flexible transparent film 106, which can allow for calibration of pressure measurements due to local temperature changes.

The flexible transparent film 106 has a resting thickness T1. The resting thickness T1 is the thickness of the flexible transparent film 106 in an environment where the air pressure is ambient air pressure. In one example, the resting thickness T1 is on the order of nanometers to centimeters. The flexible transparent film 106 is locally compressed (e.g., experiences strain) when its local environment (e.g., the environment outside of the pressure sensing film 105) is under pressures higher than ambient air pressure. Accordingly, the flexible transparent film 106 has a compressed thickness T2 in areas where pressure is higher than ambient air pressure. The amount of compression is directly related to the pressure according to the following Equation 1:

$$T2 = T1\left(1 - \frac{\sigma}{E}\right)$$

where σ is the pressure and E is the Young's modulus of the flexible transparent film 106. The local change in surface pressure (Δσ) relative to ambient pressure results in the change in thickness (ΔT=T1-T2) according to the following Equation 2:

$$\Delta T = \left(\frac{\Delta\sigma}{E}\right)T_1$$

In a particular example, the resting thickness, T1, is 1000 nm and the nominal wavelength is 1000 nm for the light beams 114a, 114b. With the material Young's modulus of E=3 kPa (3000 Pa), a change in pressure (Δσ) of 10 Pa results in a ΔT of about 3 nanometers, which results in a comparable resonance shift in wavelength. As discussed above, the thickness of the flexible transparent film 106 and thus the optical cavity 120 is related to the resonance of light beams 114a, 114b within the optical cavity.

In some examples, the spectrograph 115 is a hyperspectral camera that can resolve resonance changes associated with changes in thickness (ΔT) of the optical cavity 120 of about 2 nanometers. A hyperspectral camera is known in the art and generally includes individual pixels each working as spectrographs in order to "image" spectral distributions over a surface like the surface 102. Accordingly, the pressure sensing device 104 is capable of resolving changes in pressure of 10 Pa across a surface 102. This resolution is orders of magnitude higher than prior art devices. For instance, the resolution of pressure sensitive paint is on the order of about 1000 Pa.

Equation 2 above holds when resonance frequencies inside the optical cavity 120 are below a cutoff frequency Fc. The cutoff frequency Fc is related to the mechanical responsiveness of the flexible transparent film 106 in response to fast pressure changes, which in turn is related to response time of the pressure sensing device 104, e.g., how quickly the pressure sensing device 104 can respond in order to measure fast pressure changes at a given area of the surface 102. The cutoff frequency Fc is associated with the wavelength of an elastic wave in the flexible transparent film 106 approaching the thickness of the flexible transparent film 106. The frequency f of the elastic wave in the flexible transparent film 106 is approximately related to its wavelength $\lambda_e$ according to Equation 3 below:

$$f = \frac{1}{\lambda_e} * \sqrt{\frac{E}{\rho}}$$

where ρ is the density of the flexible transparent film 106 in the optical cavity 120. For instance, the cutoff frequency Fc can be determined when the wavelength is two times the thickness of the flexible film 106. In a more particular example, the flexible transparent film 106 is highly-diluted PDMS (e.g., PDMS with a low level of cross-linking) with E=3000 Pa, ρ=1000 kg/m$^3$, and a thickness of 1000 nanometers. In this example, the cutoff frequency Fc is estimated to be about 870 kHz. This is significantly higher than the cutoff frequency for prior art devices. For instance, the cutoff frequency for pressure sensitive paint ranges from 10 to 100 kHz.

The pressure sensing device 104 thus provides high-resolution and fast pressure measurements for pressures experienced by surface 102.

Figure 3A:
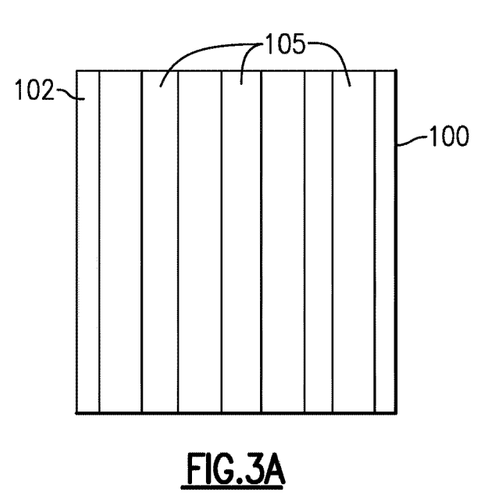
FIGS. 3A-C schematically show example arrangements of a pressure sensing film of the pressure sensing device on a surface.
Figure 3B:
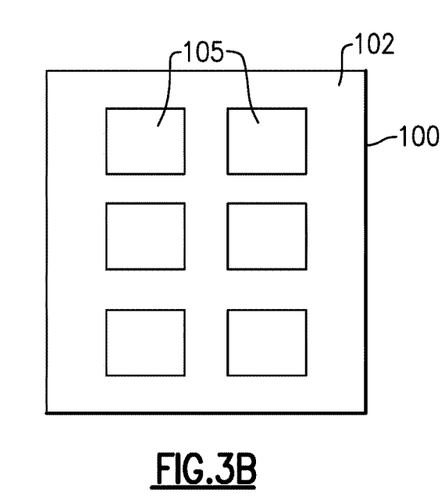
Figure 3C:
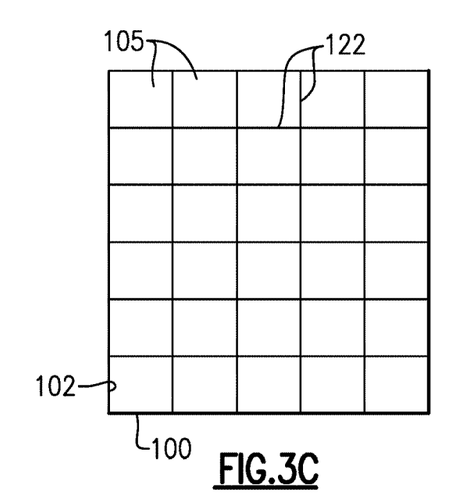

In the example of FIGS. 2 and 2B, the pressure sensing film 105 is a continuous film over the surface 102. However, in other examples, the pressure sensing film 105 can be non-continuous. FIGS. 3A-C show example arrangements of pressure sensing film 105 on the surface 102. In FIG. 3A, the pressure sensing film 105 is arranged in a series of mechanically independent or decoupled sections on the surface 102. In FIG. 3B, the pressure sensing film 105 is arranged in independent sections on the surface 102. The independent sections can have any shape or arrangement. In FIG. 3C, the pressure sensing film 105 is arranged within a frame 122. The frame 122 partitions the surface 102 and is rigid, e.g., it is much less compressible than the flexible transparent film 106. The frame 122 thus decouples individual sections of the pressure sensing film 105 so that each individual section produces a pressure reading independent of the others. Though certain example arrangements are shown in FIGS. 3A-C, these arrangements are only exemplary, and other arrangements are contemplated.

Figure 4:
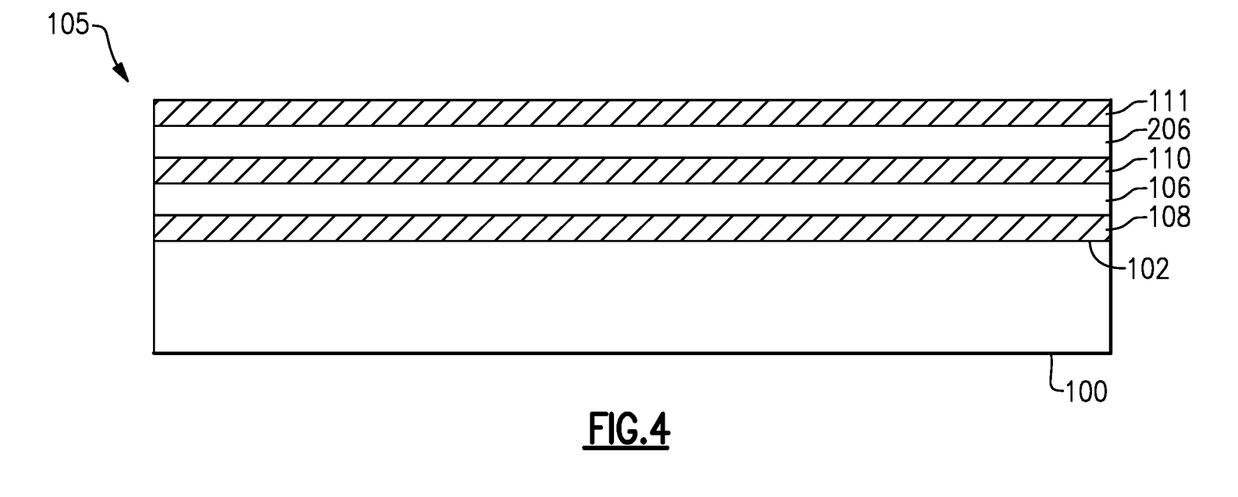
FIG. 4 schematically shows an alternate pressure sensing film.

In another example, the pressure sensing film 105 can comprise multiple flexible transparent films and/or optical cavities. In this example illustrated in FIG. 4, a second flexible transparent film 206 is sandwiched between outer layer 110 and outer layer 111. Though two flexible transparent films 106, 206 are shown, more flexible transparent films and outer layers are contemplated. In this example, each flexible transparent film 106, 206 can be configured to address different pressure ranges and associated spectral bands. For instance, the first flexible transparent film 106 can be configured to sense a broad pressure range and the second transparent film 206 can be configured for a finer pressure range for accurate measurements in that pressure range.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A pressure sensing film, comprising:
   first and second films, the first and second films spaced apart to define an interior optical cavity therebetween; and
   a flexible transparent film arranged in the optical cavity, wherein the flexible transparent film is compressible in response to a pressure change in air exterior to the first and second films.

2. The pressure sensing film of claim 1, wherein at least one of the first and second films is metallic.

3. The pressure sensing film of claim 2, wherein at least one of the first and second films comprises gold.

4. The pressure sensing film of claim 1, wherein at least one of the first and second film comprises stacked dielectric layers.

5. The pressure sensing film of claim 1, wherein the first film is reflective and the second film is semi-transparent.

6. The pressure sensing film of claim 1, wherein both the first and second films are semi-transparent.

7. The pressure sensing film of claim 1, wherein the flexible transparent film comprises a polymeric material.

8. The pressure sensing film of claim 7, wherein the flexible transparent film comprises luminescent particles.

9. The pressure sensing film of claim 8, wherein the luminescent particles are thermographic phosphors.

10. The pressure sensing film of claim 1, wherein the pressure sensing film is configured to sense a pressure adjacent a surface of a structure in a gas turbine engine.

11. A pressure sensing device, comprising:
    a pressure sensing film, comprising:
        first and second films, the first and second films spaced apart to define an interior optical cavity therebetween; and
        a flexible transparent film arranged in the optical cavity, wherein the flexible transparent film is compressible in response to a pressure change in air exterior to the first and second films;
    a light source configured to shine light onto the pressure sensing film;
    a device configured to analyze light from the pressure sensing film; and
    a computing device configured to analyze information from the device to determine a pressure change in the air adjacent the pressure sensing film based on compression of the flexible transparent film.

12. The pressure sensing device of claim 11, wherein at least one of the first and second films is metallic.

13. The pressure sensing device of claim 11, wherein at least one of the first and second film comprises stacked dielectric layers.

14. The pressure sensing device of claim 11, wherein the first film is reflective and the second film is semi-transparent.

15. The pressure sensing device of claim 14, wherein the device is configured to capture a photograph of light reflected from the first film.

16. The pressure sensing device of claim 11, wherein both the first and second films are semi-transparent.

17. The pressure sensing device of claim 16, wherein the device is configured to capture a photograph of light transmitted through from the first and second films.

18. A method of sensing pressure adjacent a surface, comprising:
    shining a light source on a pressure sensing film, the pressure sensing film comprising:
        first and second films, the first and second films spaced apart to define an interior optical cavity therebetween; and
        a flexible transparent film arranged in the optical cavity, wherein the flexible transparent film is compressible in response to a pressure change in air exterior to the first and second films;
    collecting information about light from the pressure sensing film; and
    analyzing the information to determine a pressure change in the air adjacent the pressure sensing film based on compression of the flexible transparent film.

19. The method of claim 18 further comprising filtering the information to reduce noise.

20. The method of claim 18, wherein the collecting is accomplished at least in part by a spectrograph.

* * * * *